United States Patent
Hamilton

(10) Patent No.: US 8,968,183 B2
(45) Date of Patent: Mar. 3, 2015

(54) SUPPORT APPARATUS

(76) Inventor: James Hamilton, Monmouthsire (GB)

( * ) Notice: Subject to any disclaimer, the term of this patent is extended or adjusted under 35 U.S.C. 154(b) by 0 days.

(21) Appl. No.: 13/819,835

(22) PCT Filed: Aug. 31, 2011

(86) PCT No.: PCT/GB2011/051626
§ 371 (c)(1),
(2), (4) Date: May 13, 2013

(87) PCT Pub. No.: WO2012/028872
PCT Pub. Date: Mar. 8, 2012

(65) Prior Publication Data
US 2013/0221181 A1 Aug. 29, 2013

(30) Foreign Application Priority Data
Sep. 1, 2010 (GB) .................................. 1014468.1

(51) Int. Cl.
*A61F 5/00* (2006.01)
*A47C 20/04* (2006.01)
*F16M 13/00* (2006.01)
*A61H 19/00* (2006.01)

(52) U.S. Cl.
CPC ............... *F16M 13/00* (2013.01); *A61H 19/00* (2013.01); *A61H 2201/0103* (2013.01); *A61H 2201/0134* (2013.01); *A61H 2201/0149* (2013.01); *A61H 2201/0192* (2013.01); *Y10S 5/929* (2013.01)
USPC .................... 600/38; 600/41; 5/655.3; 5/639; 5/644; 5/645; 5/653; 5/654; 5/929; 5/615; 297/452.41; 297/156; 297/188.01; 297/188.08; 297/195.1; 297/195.11; 297/463.2; 128/845

(58) Field of Classification Search
USPC ............ 248/523, 346.2, 102, 346.01; 600/38, 600/41; 5/655.3, 2.1, 639, 644–645, 653, 5/654, 929, 615; 297/452.41, 156, 297/188.01, 188.08, 195.1, 195.11, 463.2; 128/845
See application file for complete search history.

(56) References Cited

U.S. PATENT DOCUMENTS

| | | | | |
|---|---|---|---|---|
| 4,724,560 | A * | 2/1988 | Christie ............................ | 5/644 |
| 5,851,175 | A * | 12/1998 | Nickell ........................... | 600/38 |
| 6,038,719 | A * | 3/2000 | Castagna ......................... | 5/636 |
| 7,993,262 | B2 * | 8/2011 | Cianfrani ........................ | 600/38 |
| 2001/0038798 | A1 * | 11/2001 | Foster ............................ | 417/478 |
| 2004/0129274 | A1 * | 7/2004 | Espinosa ....................... | 128/845 |
| 2004/0211004 | A1 * | 10/2004 | Thompson ..................... | 5/655.3 |
| 2006/0174417 | A1 * | 8/2006 | Elrod et al. ....................... | 5/712 |
| 2007/0214572 | A1 * | 9/2007 | Buben .............................. | 5/630 |
| 2013/0200226 | A1 * | 8/2013 | Hamilton ..................... | 248/127 |

FOREIGN PATENT DOCUMENTS

| | | |
|---|---|---|
| DE | 202006015550 U1 | 2/2007 |
| GB | 2431585 A | 5/2007 |
| WO | WO-2009003243 A1 | 1/2009 |
| WO | WO-2011148151 A1 | 12/2011 |

* cited by examiner

*Primary Examiner* — Christopher Garft
(74) *Attorney, Agent, or Firm* — Lathrop & Gage LLP

(57) ABSTRACT

A support apparatus, for use in supporting a device such as a sex toy, the inflatable apparatus comprising an attachment portion and a holding portion which is attached to the attachment portion, and which defines an aperture therethrough, the holding portion having an inflatable element which is operable to adjust the size of said aperture.

15 Claims, 3 Drawing Sheets

US 8,968,183 B2

SUPPORT APPARATUS

The present invention relates to support apparatus and, in particular, support apparatus for use holding an object or device such as a sex toy.

It is common for objects, in particular interactive equipment such as toys, to be supported for use in a hands free manner. Such hands free support enables the person interacting with the toy to have more freedom of movement and the ability to interact in a variety of ways without the restriction of at least one of their hands holding the toy. With sex toys in particular, the ability to use the toy in a hands free manner can increase the enjoyment and sexual satisfaction derived from the toy.

Sex toys may be used by one person for providing pleasure to another person. Existing support arrangements for sex toys in this case typically include strap arrangements which enable one person to attach the toy to their body and use it for providing pleasure to their partner. Alternatively a sex toy may be used by a person, when alone, for providing their own pleasure. If the person is alone, they may use the straps to secure the toy at a particular location on their own body, however this means that the toy is located in a stationary position. Alternatively they could use the straps to attach the toy to a suitable surface or object so that they can obtain hands free pleasure from the toy. However, such strap arrangements usually retain the toy in a rigid position, which may make movement relative to the toy may be difficult or uncomfortable. In addition, for toys which are operable by controls mounted up the toy itself, existing support arrangements retain the toy in a manner which makes it difficult or awkward to access operating controls whilst the toy is retained in the support.

Therefore, there is a need for a hands free support for use with sex toys which can be used by one or more person which supports the toy in a way which facilitates varied and comfortable interaction with the toy and in particular which facilitates access to operating controls located on the toy. Such hands free support apparatus may be of particular use for men suffering mobility problems who are unable to support themselves in the missionary position or unable to kneel or stand comfortably for a long enough period to pleasure their partner.

It is therefore an object of the present invention to obviate or mitigate at least one of the aforementioned problems.

According to a first aspect of the present invention there is provided a support apparatus comprising: an attachment portion; and a holding portion which is attached to the attachment portion, and which defines an aperture therethrough, the holding portion having an inflatable element which is operable to adjust the size of said aperture.

The provision of support apparatus, suitable for use holding a device such as a sex toy, enables the toy to be retained in a holding portion by means of the inflatable element within an apparatus which can be secured for use using the attachment portion.

Preferably, the attachment portion is in the form of a substantially planar flexible sheet. The attachment portion may include means for attachment to a flexible body or may include means for attachment to a substantially rigid body. Preferably, the means for attachment include elongate portions which extend from respective sides of the attachment portion for fastening around such a body.

The attachment portion is provided to enable the support apparatus to be secured to any suitable unit and thus may be provided with appropriate means for attachment which can be secured to any such suitable unit.

The inflatable element may be operable to adjust the cross-section of the aperture.

Preferably, the holding portion is adapted for frictional engagement with a device inserted into the aperture.

The adjustable cross section of the aperture enables devices of varying sizes to be retained within the aperture and can in addition facilitated frictional engagement of the device.

The inflatable element will enable the device to be retained in the support apparatus in a non-rigid manner.

Conveniently, the holding portion is substantially tubular. The tubular holding portion may have a circular cross-section. However, it will be appreciated that the holding portion may have any other suitable cross-sectional shape including, but not limited to, square, rectangular, triangular or oval.

Preferably at least one part of the substantially tubular holding portion is provided with substantially planar walls.

The inflatable element may be provided with a valve to facilitate inflation and deflation.

The inflatable element is preferably provided with a hand activated pump to facilitate selective inflation and deflation.

In one embodiment, the holding portions is further provided with a holding surface that extends across the aperture at an inner edge region of the holding portion, the holding surface being adapted to retain flexibly, in at least one direction, a device inserted into the holding aperture.

The incorporation of a holding surface enables devices of very slim construction or malleable construction to be retained in the holding portion until secured by frictional engagement.

In another embodiment, the support apparatus is further provided with an inflatable body to which the means for attachment are secured. The inflatable body may be formed of a first inflatable portion and the inflatable body may further comprising a second inflatable portion, located within the first inflatable portion, which serves as a secondary structural element of the inflatable body.

The second inflatable portion, provided within the first inflatable portion will, when inflated, provided extra stability and support to the support apparatus.

Embodiments of the present invention will now be provided, by way of example only, and with reference to the following figures, in which.

Throughout the description the same reference numerals will be used in each Figure to refer to components which are substantially the same.

Figure 1:
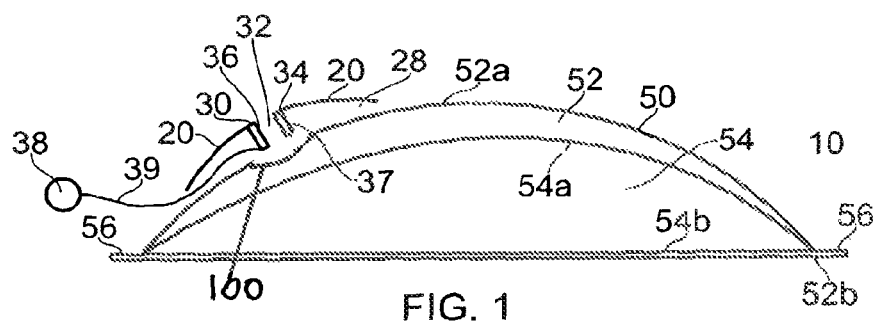
FIG. 1 is a cross-sectional view from the side of a support apparatus according to a first embodiment of the present invention.

FIG. 1 shows a cross section side view of support apparatus 10 comprising an attachment portion 20, which in this case is formed of a planar flexible plastic sheet. The support apparatus 10 also comprises a holding portion 30 which is attached to, and projects from, the attachment portion 20 and defines an aperture 32 therethrough. The holding portion 30 comprises an inflatable element 34 the inner surface 36 of which defines said aperture 32 wherein the inflation and deflation of the inflatable element 34 causes the size of aperture 32 to be adjusted. The inflatable element 34 connected to a hand pump 38 by tube 39. The support apparatus 10 further comprises to an inflatable body 50 having a first inflatable portion 52 and a second inflatable portion 54. The first inflatable portion 52 has first surface 52a and second surface 52b which are bonded together at bonded edge 56 to provide airtight inflatable portion 53. The second inflatable portion 54 is defined by third surface 54a and a fourth surface 54b which are bonded together between first surface 52a and second surface 52b at bonded edge 56 to provide an airtight inflatable portion 55. The second inflatable portion 54 is located within the first inflatable portion 52. The attachment portion 20 is secured, using attachment means (not shown) to the first surface 52a of the inflatable body 50 such that the holding portion 30 projects from the attachment portion 20 towards the first surface 52a.

The inner surface 36 of the holding portion 30 is adapted such that, upon inflation, frictional engagement occurs with a device (not shown), such as a dildo, inserted into the aperture 32. As the holding portion 30 is adjustable, the apparatus 10 will be able to accommodate devices of various cross-sectional diameters and shapes.

Figure 2:
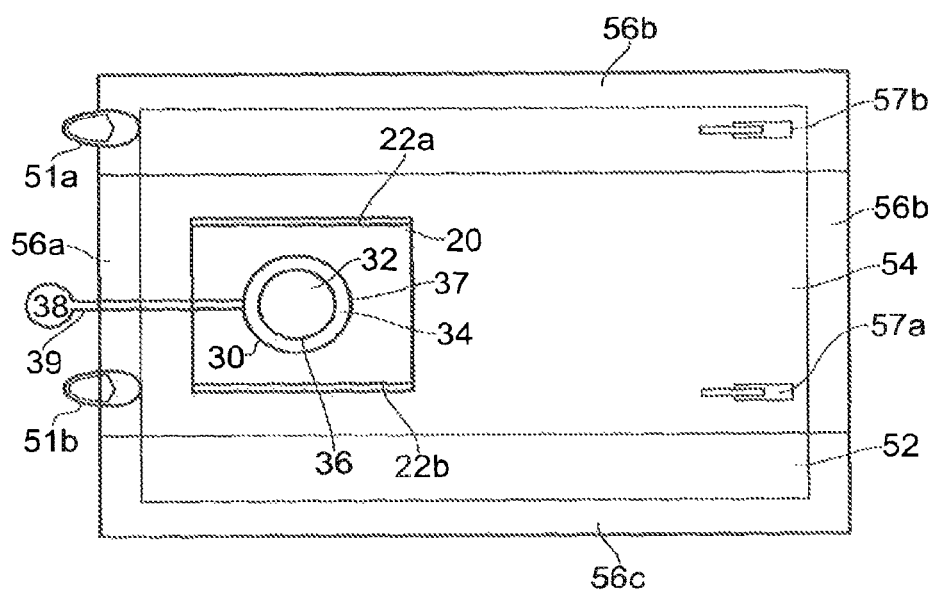
FIG. 2 is a plan view of the support apparatus shown in FIG. 1.

With reference to FIG. 2 there can be seen a plan view of the support apparatus 10 of FIG. 1. The apparatus 10 has a rectangular shaped footprint defined by the first inflatable portion 52 of the inflatable body 50. Bonded edge 56 is provided around the perimeter of the first inflatable portion 52 providing an airtight seal. The first inflatable portion 52 is provided with a first main valve 51a which enables inflation and deflation of inflatable portion 52. The first inflatable portion 52 is further provided with a first fine tuning valve 57a. Fine tuning valve 57a enables a user to adjust the inflation of the inflatable portion 52 by small degrees of pressure until a desired cushioning effect is obtained. Attachment portion 20 can be seen to define a rectangle and is secured to first surface 52a of first inflatable portion at edges 22a and 22b respectively. Two other edges of attachment portion 20 are not secured to first surface 52a. Outer surface 37 of holding portion 30 is secured to attachment portion 20. Aperture 32 is defined by inner surface 36 of holding portion 30. The inflatable element 34 connected to a hand pump 38 by tube 39 which passes through the void (not shown) created between attachment portion 20 and first surface 52a. The second inflatable portion 54 is located within the first inflatable portion 52 and is bonded at edges 56a and 56b to provide inflatable portion 54 with an airtight seal. The second inflatable portion 54 is provided with a second main valve 51b which enables inflation and deflation of second inflatable portion 54. The second inflatable portion 54 is further provided with a second fine tuning valve 57b thus enabling a user to adjust the inflation of the inflatable portion 54 by small degrees of pressure until a desired cushioning effect is obtained.

Figure 3:
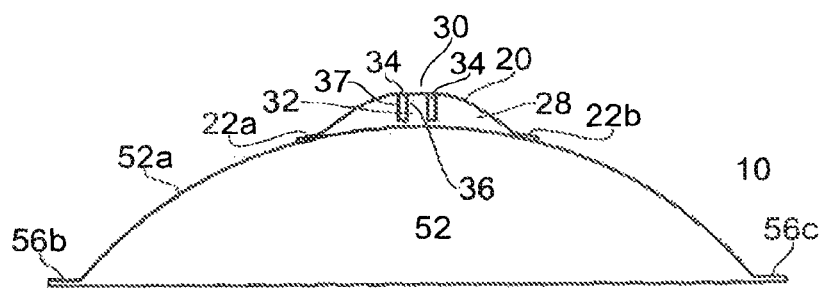
FIG. 3 is an end view of the support apparatus shown in FIG. 1.

In FIG. 3 is shown an end view of the support apparatus of FIGS. 1 and 2. As can be seen, the attachment portion 20 is secured to first surface 52a at edges 22a and 22b. Such that a void 28 is defined therebetween which can be accessed under the remaining two open ends (not shown) of the attachment portion 20. Holding portion 30 projects from attachment portion 20, into void 28, towards first surface 52a.

Figure 4A:
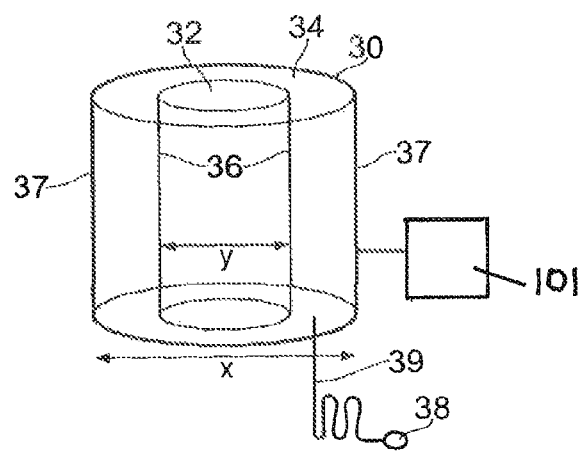
FIG. 4A is a perspective cross-sectional view from the side of a holding portion, shown in an un-inflated state, of the inflatable apparatus of FIG. 1.
Figure 4B:
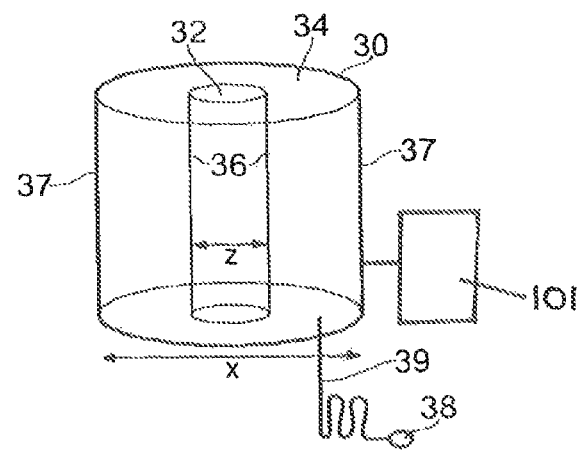
FIG. 4B is a perspective cross-sectional view from the side of the holding portion of FIG. 4A in an inflated state.

As can be seen in FIG. 4A, the holding portion 30 defines an annular cylinder which is bounded by an inner surface 36 and outer surface 37. Hand pump 37 is connected to the holding portion 30 by tube 36. In FIG. 4A the holding portion 30 is shown in an un-inflated state wherein the outer surface 37 has a cross-sectional diameter x and inner surface 36 has a cross-sectional diameter y. In FIG. 4B, the holding portion 30 is shown in an inflated state and as can be seen, the outer surface 37 maintains substantially the same diameter x before and after inflation however inner surface 36 has a diameter z wherein z<y. Holding portion 30 is provided with a valve 101.

During use, the first inflatable portion 52 is inflated via main valve 51a with any fine adjustment to pressure being made via fine tuning valve 57a until a desired degree of inflation is achieved. The second inflatable portion 54 may then, if desired, be inflated via main valve 51b with any fine adjustment to pressure being made via fine tuning valve 57b until a desired degree of inflation is achieved. A device (not shown), in this case a sex toy such as a dildo, is inserted into aperture 30 where it comes to rest against the first surface 52a. Inflatable element 34 is inflated using hand pump 38 until frictional engagement is achieved between the toy (not shown) and the inner surface 36. The support apparatus 10 can then be secured to a desired surface (not shown) using a strapping arrangement (not shown) affixed to the apparatus 10 and used as desired. It will be appreciated that any suitable strapping arrangement which would secure the apparatus 10 could be used and this could be provided separately to the apparatus 10 or be integral with the apparatus 10. When the apparatus 10 is being used by a person for their own pleasure, the apparatus 10 could be attached by a strapping arrangement (not shown) to objects such as a pillow or a seat. A particular benefit of the support apparatus is that the inflatable element 34 of holding portion 30 can be inflated to accommodate toys of varying shapes and sizes. In addition, a user can gain access to any controls provided on the toy (not shown) by way of the void 28 defined between the attachment portion 20 and the first surface 52a.

Figure 5:
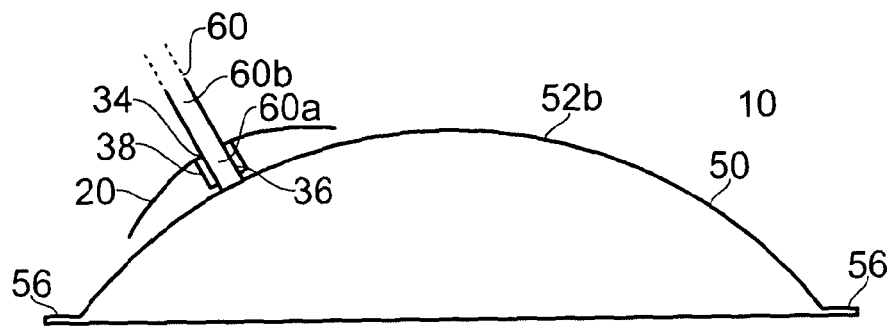
FIG. 5 is a cross-sectional view from the side of the support apparatus of FIG. 1 holding a toy.

FIG. 5 illustrates an example of the apparatus 10 of the above embodiment retaining a toy 60. As can be seen, the base portion 60a of the toy 60 is located and retained in the aperture 30 with the top body 60b of the toy 60 projecting from the aperture away from the apparatus 10.

Figure 6:
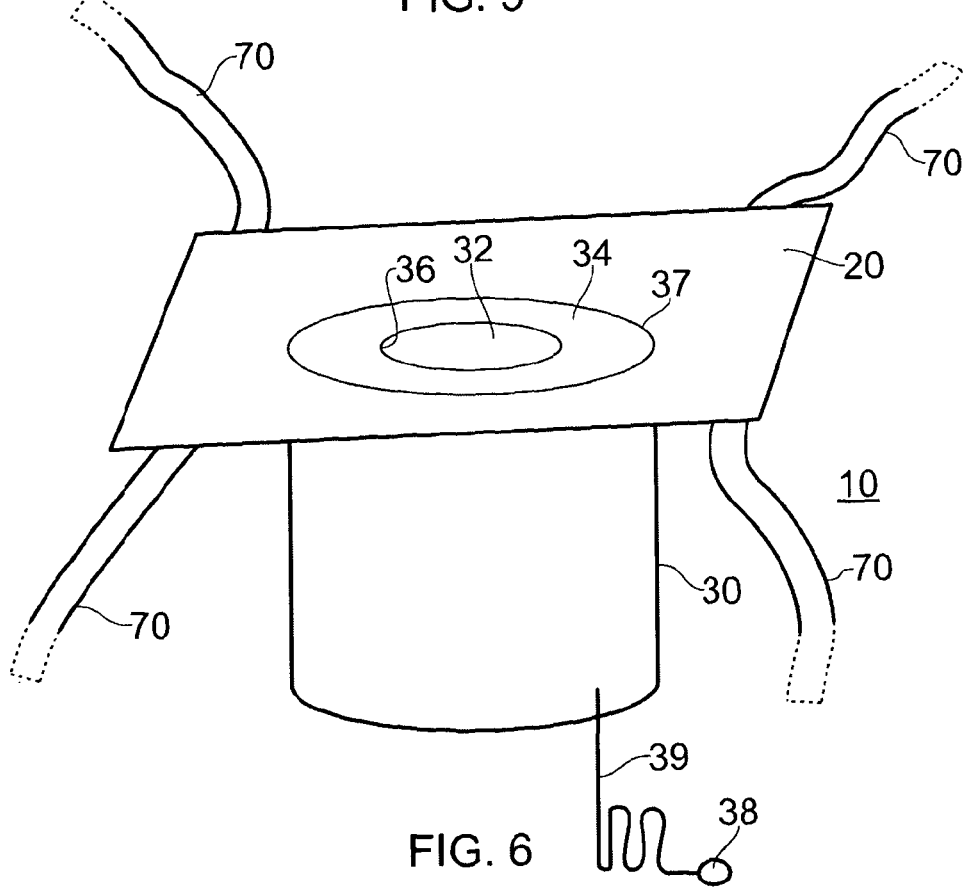
FIG. 6 is a perspective view of a support apparatus according to a second embodiment of the invention.

FIG. 6 illustrates a second embodiment of the support apparatus 10. In this embodiment, the support apparatus 10 comprises attachment portion 20, which in this case is formed of a planar flexible plastic sheet. The support apparatus 10 also comprises a holding portion 30 which is attached to, and projects from, the attachment portion 20 and defines an aperture 32 therethrough. The holding portion 30 comprises an inflatable element 34 the inner surface 36 of which defines said aperture 32 wherein the inflation and deflation of the inflatable element 34 causes the size of aperture 32 to be adjusted. The inflatable element 34 connected to a hand pump 38 by tube 39. The support apparatus 10 is further provided with straps 70 which project from the outer edge 20a of attachment portion 20.

During use, a device (not shown), in this case a sex toy such as a dildo, is inserted into aperture 30 and is held in position by the user until inflatable element 34 is inflated using hand pump 38 until frictional engagement is achieved between the toy (not shown) and the inner surface 36. The support apparatus 10 can then be secured to a desired surface (not shown) using a strapping arrangement such as straps 70 affixed to attachment portion 23 of the apparatus 10. The support apparatus is secured such that the holding portion 30 projects towards the surface (not shown) and the device (not shown) projects away from the surface (not shown) and the apparatus 10 and can be used as desired. It will be appreciated that whilst straps 70 are illustrated, any suitable strapping arrangement which would secure the apparatus 10 could be used and this could be provided separately to the apparatus 10 or be integral with the apparatus 10. When the apparatus 10 is being used by a person for their own pleasure, the apparatus 10 could be attached by straps 70 to objects such as a pillow or a seat. A particular benefit of the support apparatus is that the inflatable element 34 of holding portion 30 can be inflated to accommodate toys of varying shapes and sizes. In addition, a user can gain access to any controls provided on the toy (not shown) by way of the void 28 defined between the attachment portion 20 and the surface (not shown) against which the apparatus 10 is secured.

Figure 7:
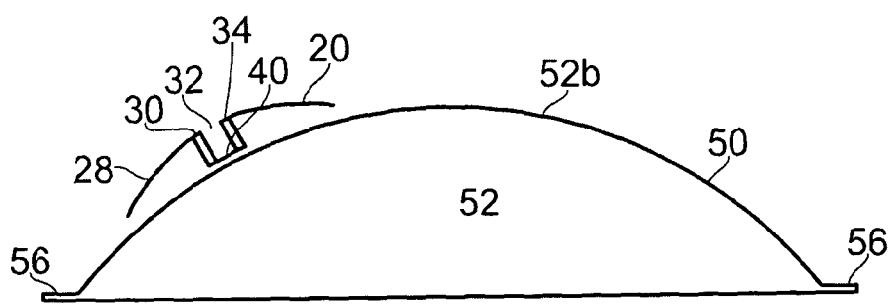
FIG. 7 is a cross-sectional view from the side of a support apparatus according to a third embodiment of the invention.

With reference to FIG. 7, it can be seen that in a further embodiment, holding portion 30 of support apparatus 10 is provided with a retention surface 40 which extends across the aperture 32 at end 34b of inflatable element 34. This embodiment of apparatus 10 will be of particular use to retain toys (not shown) of slim or malleable construction which could otherwise slip out between the end 34b of inflatable element 34 and first surface 52a prior to the inflatable element 34 being inflated to ensure frictional engagement is achieved. The retention surface 40 may be formed of a suitably soft sheet material to enable controls provided on the toy (not shown) to be manipulated by a user via void 28.

First surface 52a may be provided with a non-stick portion at least a part of which is located immediately below the aperture 32. This assists with retaining a device within aperture 32 and preventing it slipping relative to first surface 52a. Depending on the item to be held within aperture 52a, it may be preferable to provide a concave portion 100 in first surface 52a immediately below aperture 32 into which the base portion of an item held within aperture 32 may be received, in a similar manner to that in which a cup is held within a cup holder. The concave portion 100 may be any suitable size, shape and depth to hold a part of the base portion of an item held within aperture 32 so as to prevent the base of the item slipping relative to surface 52a. Typically, a shallow substantially circular concave portion should be sufficient for most applications.

Various modifications may be made to the embodiments hereinbefore described without departing from the scope of the invention. For example it will be appreciated that the support apparatus 10, which has been detailed as having a rectangular footprint in the embodiments above, may have any suitable footprint.

In addition, the support apparatus 10 may be of any suitable dimension for the environment in which it is to be used e.g. a support apparatus 10 designed for attachment to and use on a seat will be of a smaller size than a support apparatus 10 designed for attachment to and use with a pillow. The support apparatus 10 may have strapping or fastening equipment which is used to secure the apparatus to the chosen surface for use, the fastening equipment may be separate to, or integral with, the inflatable apparatus. The fastening equipment may include, but not be limited to, straps, Velcro®, webbing, studs or clips. Alternatively, the inflatable apparatus 10 may be a "stand alone" product which can be used without any strapping or securing. The inner surface 36 of the apparatus 10 may be formed as a double skinned wall having air therebetween, however any alternative suitable wall construction could be used. Furthermore, whilst the above embodiments have detailed the holding portion 30 as having a circular cross-section, it will be appreciated that the holding portion 30 may have any other suitable cross-sectional shape including, but not limited to, square, rectangular, triangular or oval. Similarly, the holding portion 30 has been detailed as being substantially tubular however it may have any suitable three dimensional shape including, but not limited to, a conical or tapering shape. The inflatable body 50 has been illustrated as having a first inflatable portion 52 has been shown a having a second inflatable portion 54 located within it. However, it will be understood that the inflatable body 50 may be provided with only a first inflatable portion 52. Alternatively, the first inflatable portion 52 may be provided with more than one additional inflatable portion should a different internal support structure for the inflatable body 50 be desired.

The invention claimed is:

1. A support apparatus comprising:
   an attachment portion comprising a flexible sheet;
   a holding portion which is attached to the flexible sheet, and which defines an aperture therethrough, the holding portion having an inflatable element which is adapted for frictional engagement with a device inserted into the aperture and is operable to adjust the size of said aperture; and
   an inflatable body,
   the flexible sheet being attached to the inflatable body so as to define a void between the flexible sheet and the inflatable body, the void being accessible to a user, and
   the inflatable body being provided with a concave portion positioned to receive a base of the device inserted into the aperture of the holding portion.

2. A support apparatus as claimed in claim 1 wherein the attachment portion further includes a strapping arrangement.

3. A support apparatus as claimed in claim 1 wherein the inflatable element is operable to adjust the cross-section of the aperture.

4. A support apparatus as claimed in claim 1 wherein the holding portion is substantially tubular.

5. A support apparatus as claimed in claim 4 wherein the tubular holding portion has a circular cross-section.

6. A support apparatus as claimed in claim 1 wherein the inflatable element is provided with a valve to facilitate inflation and deflation.

7. A support apparatus as claimed in claim 1 wherein the inflatable element is provided with a hand activated pump to facilitate selective inflation and deflation.

8. A support apparatus as claimed in claim 1 wherein the inflatable body comprises a first inflatable portion.

9. A support apparatus as claimed in claim 8 wherein the inflatable body further comprises a second inflatable portion, located within the first inflatable portion, which serves as a secondary structural element of the inflatable body.

10. A support apparatus as claimed in claim 1 wherein the flexible sheet has a plurality of edges, at least one edge being attached to a first surface of the inflatable body and at least one edge being unattached to allow access to said void.

11. A support apparatus as claimed in claim 10 wherein at least two edges of the flexible sheet are attached to the first surface of the inflatable body, and at least one edge being unattached to allow access to said void.

12. A support apparatus as claimed in claim 11 wherein two edges of the flexible sheet are attached to the first surface of the inflatable body and two edges of the flexible sheet are unattached.

13. A support apparatus as claimed in claim 1 having a substantially rectangular footprint.

14. A support apparatus as claimed in claim 1 for holding a sex toy.

15. A support apparatus for holding a sex toy comprising:
    an attachment portion comprising a flexible sheet;
    a substantially tubular holding portion which is attached to the flexible sheet, and which defines an aperture therethrough, the holding portion having an inflatable element which is adapted for frictional engagement with the sex toy inserted into the aperture and is operable to adjust the size of said aperture, the inflatable element being provided with a hand activated pump to facilitate selective inflation and deflation, two edges of the flexible sheet being attached to an inflatable supporting body having a first surface so as to define a void between the flexible sheet and the first surface, two edges of the flexible sheet being unattached to said first surface, thereby permitting user access to the void; and the first surface being provided with a concave portion positioned to receive a base of the sex toy inserted into the aperture of the holding portion; and the inflatable supporting body having a generally rectangular footprint.

* * * * *